US012607801B1

(12) United States Patent
Cramer et al.

(10) Patent No.: US 12,607,801 B1
(45) Date of Patent: Apr. 21, 2026

(54) ASSEMBLY DEVICE FOR A LIGHT GUIDE

(71) Applicant: Schott AG, Mainz (DE)

(72) Inventors: Martin Cramer, Mainz (DE); Sandra Mattheis, Mainz (DE); Marc Timon Sprzagala, Mainz (DE); Kerstin Russert, Mainz (DE); Jonas Grimm, Mainz (DE); Henrik Groß, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 19/247,414

(22) Filed: Jun. 24, 2025

(30) Foreign Application Priority Data

Jun. 24, 2024 (DE) ...................... 10 2024 117 717.9

(51) Int. Cl.
G02B 6/04 (2006.01)
F21V 8/00 (2006.01)
(52) U.S. Cl.
CPC ............. G02B 6/04 (2013.01); G02B 6/0008 (2013.01)
(58) Field of Classification Search
CPC ................................ G02B 6/04; G02B 6/0008
See application file for complete search history.

(56) References Cited

U.S. PATENT DOCUMENTS

| | | | | |
|---|---|---|---|---|
| 6,222,970 B1 * | 4/2001 | Wach | ...................... | G02B 6/241 385/115 |
| 10,627,582 B2 | 4/2020 | Shimakawa et al. | | |
| 2008/0188843 A1 | 8/2008 | Appling et al. | | |
| 2016/0011356 A1 | 1/2016 | Galarza | | |
| 2024/0302586 A1 * | 9/2024 | Schultheis | ............. | G02B 23/26 |

FOREIGN PATENT DOCUMENTS

| | | |
|---|---|---|
| DE | 32 47 500 C2 | 11/1984 |
| DE | 35 34 280 C1 | 10/1986 |
| DE | 36 20 368 C2 | 7/1990 |
| DE | 197 03 515 C1 | 9/1998 |
| DE | 100 13 482 A1 | 9/2001 |

OTHER PUBLICATIONS

Examination Request dated Feb. 12, 2025 for German Patent Application No. 10 2024 117 717.9 (3 pages).

* cited by examiner

*Primary Examiner* — Michael P Mooney
(74) *Attorney, Agent, or Firm* — TAYLOR & EDELSTEIN, PC

(57) ABSTRACT

An assembly device includes a sleeve having an end face and a fiber bundle circumferentially fused at its circumferential surface with a glass tube. The fiber bundle with the glass tube having a common end face. The fiber bundle with the glass tube forming a tapered region towards the common end face. The common end face has a fused, rigid section. The common end face is designed or designable as a ground and/or polished surface. The fiber bundle is cohesively fixed or fixable in the tapered region in or on a fixing section of the sleeve by an adhesive. The common end face has an offset relative to the fixing section such that the common end face is arranged or arrangeable to be spaced apart with an offset from the fixing section with the adhesive. The fixing section and the common end face are separated or separable from each other.

10 Claims, 2 Drawing Sheets

ASSEMBLY DEVICE FOR A LIGHT GUIDE

CROSS REFERENCE TO RELATED APPLICATIONS

This application claims priority to German Patent Application No. 10 2024 117 717.9 filed on Jun. 24, 2024, which is incorporated in its entirety herein by reference.

BACKGROUND OF THE INVENTION

1. Field of the Invention

The invention relates to an assembly device for a light guide, comprising a sleeve having an end face and at least one fiber bundle, wherein the fiber bundle is circumferentially fused at least in part or in sections at its circumferential surface with a glass tube. The fiber bundle has a common end face with the glass tube. The fiber bundle forms with the glass tube a tapered region towards the common end face and the common end face has a fused, rigid section. The common end face is designed or designable as a ground and/or polished surface. Furthermore, the fiber bundle with the glass tube is cohesively fixed or fixable in the region of the taper at least in part or in sections in or on the sleeve in or on the fixing section of the sleeve by an adhesive.

2. Description of the Related Art

Such light guides with a fiber bundle, which is fused with a glass tube, are described in DE3620368C2 by the applicant. That document illustrates a fiber-optic light guide with a front surface region made up of one end of a light-guide fiber bundle and a glass tube section applied to this end, wherein the front surface is polished. Provision is made for both the glass tube section and the light-guide fiber bundle to be made of high-temperature-resistant glass and for the glass tube section to be applied to the light-guide fiber bundle in the molten state over a defined length in such a way, that the gussets present between the individual light-guide fibers and/or the gussets present between the light-guide fibers and the tube section are at least partially filled by the material of the glass tube section and/or by the material of the light-guide fiber claddings.

This method for producing such light guides is also known as GTF (Glass Tube Fusion). These light guides are then assembled in a metal sleeve or further processed into light-guide cables and are mainly used in medical applications.

The two documents DE19703515C1 and DE10013482C2 also describe fiber bundles with a fused glass tube section. In both cases, provision is made for the glass tube to be removed again for further assembly of the fiber bundles in a sleeve. For this purpose, use is also made of complex methods which can lead to damage to the light guides.

When assembling such glass-tube-fused fiber bundles into an assembly sleeve, usually made of stainless steel, by means of an adhesive, however, it has been shown that this can lead to stresses in the fiber composite, which can then induce cracks. This occurs in particular with medico-technical use of such light guides if they have to be processed after use by thermal processes, such as steam sterilization for further, multiple uses. High temperature changes occur here, which then damage the light guide and make it unusable after just a few such cycles.

In order to avoid damage to a fused fiber-optic end, a flexible light guide with at least one fused fiber-optic end, which is attached to an end piece, wherein a layer of cushioning material is located between the fused fiber-optic end and the end piece, is described in document US2016011356. The layer of cushioning material is designed to compensate for differences in thermal expansion and contraction of the fused fiber-optic end and the end piece to avoid damage to the fused fiber-optic end, such as may occur when an autoclave is run through multiple times. The cushioning layer can be made, for example, by wrapping the fused glass fiber end with PTFE tape, thread sealing tape or similar.

This is an approach that appears to be possible at first, in particular to avoid stresses. However, this approach has the disadvantage that it is not possible to ensure a compact body due to such cushioning layers. Microscopically fine gaps can cause germs to settle in these gaps, which cannot be sufficiently completely eliminated even by autoclaving, thereby increasing the risk of contamination. This can lead to serious complications in patients, in particular in medico-technical environments.

A further approach to avoid cracks during or due to temperature changes is the use of permanently elastic adhesives. However, it has been shown that such adhesives often do not have the long-term stability for, for example, several hundred autoclaving cycles, as is often required. Over time, chemical bonds in the adhesive break up here, which causes such adhesives to decompose or even liquefy as the number of processing cycles progresses, rendering the light guide unusable.

What is needed in the art is a way to provide an assembly device which circumvents the above-mentioned disadvantages and which enables a robust, long-term stable light guide that is resistant to temperature changes or such a light-guide assembly for continuous use, in particular in medico-technology environments.

SUMMARY OF THE INVENTION

In some embodiments provided according to the present invention, an assembly device for a light guide includes a sleeve having an end face and at least one fiber bundle circumferentially fused at least in part or in sections at its circumferential surface with a glass tube. The at least one fiber bundle with the glass tube has a common end face. The at least one fiber bundle with the glass tube forms a tapered region towards the common end face. The common end face with the glass tube has a fused, rigid section and the common end face is designed or designable as a ground and/or polished surface. The at least one fiber bundle with the glass tube is cohesively fixed or fixable in the tapered region at least in part or in sections in or on the sleeve in or on a fixing section of the sleeve by an adhesive. The common end face of the at least one fiber bundle with the glass tube has an offset relative to the fixing section of the sleeve with the adhesive such that the common end face is arranged or arrangeable so as to be spaced apart with an offset from the fixing section with the adhesive. The fixing section and the common end face are separated or separable from each other.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figures 1, 2:
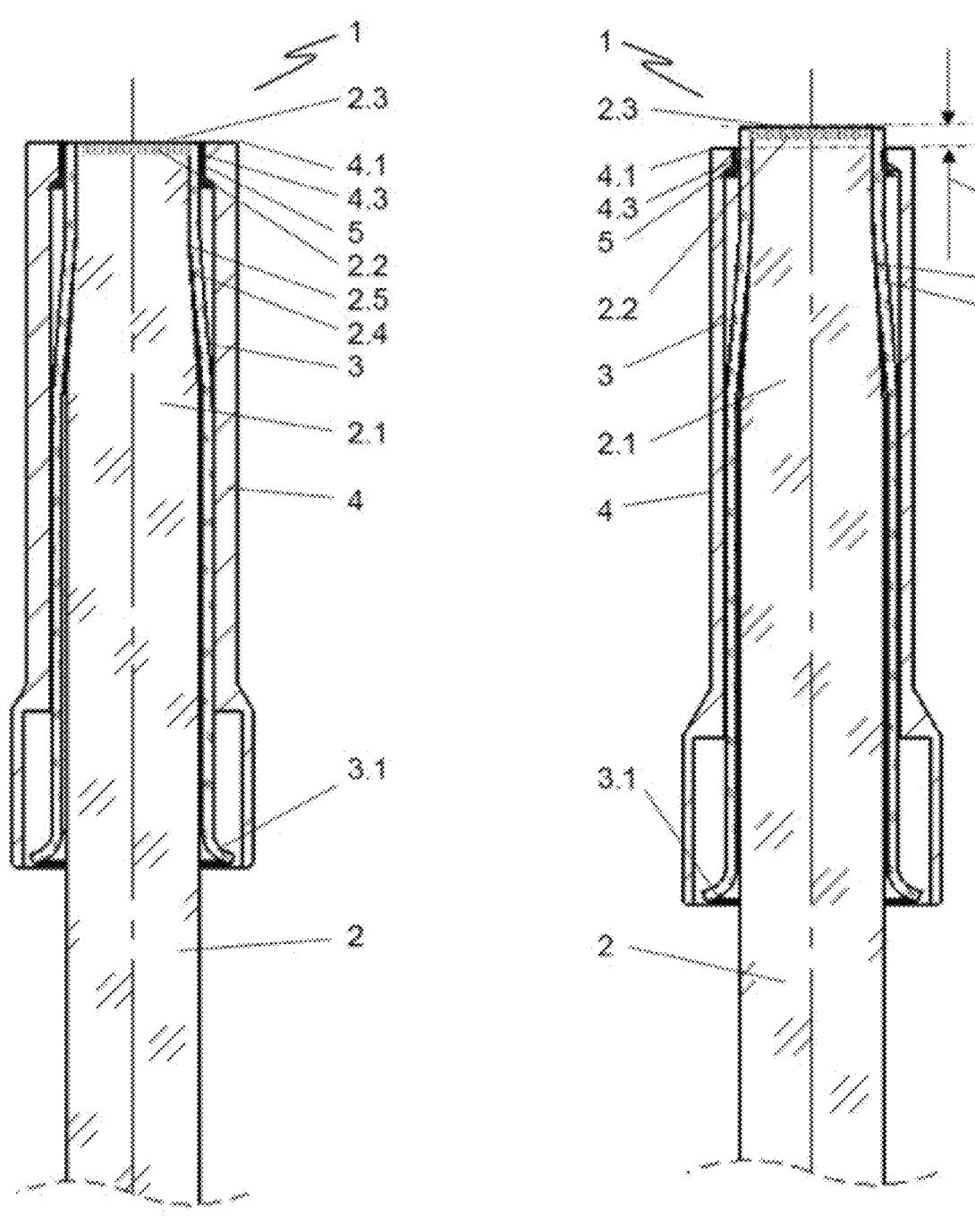
FIG. 1 schematically shows an assembly device according to the prior art.
FIG. 2 schematically shows an assembly device provided according to the invention.

According to the invention, an assembly device has an offset of the common end face of the fiber bundle with the glass tube relative to the fixing section of the sleeve with the adhesive such that the common end face is arranged or arrangeable so as to be spaced apart with an offset from the fixing section with the adhesive. The particularly crack-prone common end face of the glass tube fusion forms a projection or a specific piece projects freely far beyond the sleeve end face such that the fixing section with the adhesive is isolated from the sensitive region of the common end face and thus stresses induced by the adhesive or the bonding on the common end face of the fiber bundle and glass tube can be avoided or at least reduced.

In other words, provided is an assembly device for a light guide, comprising a sleeve with an end face and at least one fiber bundle, wherein the fiber bundle is surrounded at its circumferential surface with a glass tube and is at least in part or in sections circumferentially fused, and the fiber bundle has or forms a common end face with the glass tube. Further, the fiber bundle with the glass tube forms a tapered region towards the common end face, and the common end face has a fused, rigid section with the glass tube. The common end face is designed or designable as a ground and/or polished surface. Furthermore, the fiber bundle with the glass tube is cohesively fixed or fixable in the region of the taper at least in part or in sections in or on the sleeve in or on the fixing section of the sleeve by an adhesive. The cohesive bond is thus formed in particular in or on the fixing section, but can also be continued in the interior of the sleeve, facing away from the end faces, i.e. behind the fixing section in or on the sleeve. The common end face of the fiber bundle further has an offset relative to the fixing section of the sleeve such that the common end face of the fiber bundle with the glass tube is arranged or arrangeable so as to be spaced apart with an offset from the fixing section, and the fixing section and the common end face are separated or separable from each other. For the purposes of the invention, the assembly device comprises in particular a sleeve in which the fiber bundle with the fused glass tube can be assembled or bonded by adhesive. Such a fused fiber bundle may be provided in a light guide at both the distal and proximal ends or at both ends of the light guide. The assembly device is also understood to be a device that allows the attachment, connection, arrangement or assignment to or with further devices, assemblies or components. These can be in the medical environment, but also in other application areas, light sources, camera modules or endoscopic handpieces.

Such a light guide comprises at least as a light-guide element or light-guide elements a multiplicity of light-guide fibers, which then form a fiber bundle. Provision may also be made for the fiber bundle to be at least in part or in sections combined in a cladding or surrounded by one and thus form a light-guide cable with cladding. In the region of a sleeve or ferrule, the cladding can be removed and only the light-guide elements are fixed in the sleeve cohesively and/or with a form-fit or, if necessary, also with a force fit. Fixation in a sleeve together with the cladding may also be provided. A light-guide element or optical light-guide fibers are optionally glass-based fibers (glass optical fibers-GOF) and are usually designed as so-called core-cladding systems.

In some configurations of the assembly device for a light guide, the offset between the common end face of the fiber bundle and the glass tube and the sleeve end face is in the range of 0.1 mm to 2 mm, optionally in the range of 0.5 mm to 1.0 mm. It has accordingly been shown that such an offset or such an offset distance between the common end face of the fiber bundle and the glass tube and the adhesive surrounding the fiber bundle in the fixing section may be advantageous. On the one hand, this is due to the fact that the free-standing projection must not be too large in terms of its mechanical stability. In principle, larger offset distances than the maximum of 2 mm are also conceivable but make little sense due to the increasing mechanical sensitivity of such a design. On the other hand, however, a specific minimum distance between the fusion zone, i.e. the fused region of the fiber bundle and glass tube, in particular in the region of or near the common end face, and the adhesive edge or the bonding of fiber bundles with the glass tube in the sleeve is necessary to ensure a sufficiently great isolation of the mechanical stresses, which result, for example, from differences in thermal expansion, in particular of the adhesive and sleeve in relation to glass, on the fusion zone. Thus, the introduction of mechanical stress into the common end face is avoided or at least reduced or minimized, so that the light guide can withstand repeated thermal loads without damage, for example without cracks, chipping or delamination. Such loads regularly occur, for example, in medical environments during the processing required there, in particular through thermal process steps during sterilization, for example during autoclaving, after use or before another use of a light guide.

In some embodiments provided according to the invention, provision is alternatively or additionally made for a distance of 0.05 mm to 0.2 mm to be formed or formable inside in the fixing section between the glass tube and the sleeve in part or in sections as an adhesive gap for the adhesive. Excessively large adhesive gaps favor excessive eccentricity of the fiber bundle in the sleeve or can have a negative effect on the position tolerance of the fiber bundle in the sleeve. This can be detrimental in the operating state, in particular in the operating state during the light input coupling or the light output coupling or the positioning of the light guide in relation to the further assemblies connected thereto. An adhesive gap that is too small can lead to the fact that not enough adhesive is wetting the surfaces in places and air gaps can occur, which in turn can be detrimental during processing, but also during use. Such air gaps can fill with media, germs or contaminants, which is not tolerable, especially in medical use in or on the body, or, even during processing with chemical components, can lead to further damage to the bonding and ultimately to the failure of the light guide.

In other exemplary embodiments of the assembly device for a light guide, the sleeve is alternatively or additionally designed in such a way that the fixing section is arranged or arrangeable so as to be spaced apart by the offset from the sleeve end face and a ring is formed or formable such that in the assembled state a circumferential groove is formed in the region of the common end face between the ring and the glass tube, and the sleeve end face and the common end face of the fiber bundle and the glass tube form one plane. This enables especially fully circumferential lateral mechanical protection of the free-standing glass-tube-fused fiber bundle to be achieved. It should be noted here that the ring of the sleeve can also project over the common end face of the fiber bundle and glass tube, in principle. However, this may not be conducive to the production process, since usually the light guide or its end face with the fiber bundle assembled or bonded into the sleeve is subjected to a grinding and polishing process and thus a possible projection of the ring is removed.

With regard to the avoidance of gaps that are too narrow, which favors the formation of germs, as mentioned in the introductory part, the width of the groove (groove width) between the ring of the assembly sleeve and that with the glass tube is at least 0.3 mm, optionally at least 0.5 mm. This ensures that the sterilization processes used in medical environments, such as steam sterilization or autoclaving or plasma sterilization methods, e.g. Sterrad™ methods, can provide a sufficiently large attack opening or surface and thus a sufficiently high reduction, for example a multiple, for example 6-fold, log-step reduction, of germs can be achieved. Depending on the design of the light guide or possible, permissible or required total geometry of the assembly device, in particular with regard to its width or diameter transversely to its axis, the groove can have widths in the range of up to a few 0.1 mm, in any case greater than 0.3 mm, or up to a few millimeters, e.g. in the range of greater than or equal to 0.3 mm to 3 mm, optionally greater than or equal to 0.3 mm to 1.5 mm.

In some configurations of the assembly device for a light guide, the sleeve comprises or consists of stainless steel, for example of the materials 1.4301 or 1.4305, plastic or a combination of both material classes, for example in a multi-part assembled sleeve. In a plastic embodiment, plastics based on, for example, PPSU (polyphenyl sulfone) or PEEK (polyether ether ketone) have particularly proven their worth in medico-technical environments. These are characterized by a sufficiently good thermal stability on the one hand and particularly high mechanical stiffness on the other. In addition to the material class of stainless steels, other metallic materials, such as nickel silver or brass, are also conceivable, in principle. However, stainless steel may be preferred in terms of corrosion resistance and biocompatibility, especially in medico-technical environments. In principle, the following selection criteria are advantageous for the material: on the one hand, the material must be mechanically stable enough with regard to the final grinding and polishing process in order to be able to be clamped in a clamping device. On the other hand, the material must not be prone to "lubricating", i.e. it must optionally be brittle and/or filled with glass fibers (glass fiber-filled plastics) or other, for example ceramic or glass, fillers. They can also be adhesively bonded well to the fiber bundle of the light guide.

In some embodiments of the assembly device for a light guide, the adhesive comprises or consists of highly cross-linking brittle-hard epoxy adhesives. These are used to ensure a sufficiently good reprocessing. This often requires more than 100 to 1000 processing cycles, in particular autoclaving cycles. The decisive adhesive properties for such brittle-hard, highly crosslinking adhesives are here: the highest possible tensile shear strength, the highest possible glass transition temperature, which, like high or increased hardness, is also an indication of the degree of crosslinking, the lowest possible coefficient of thermal expansion, the lowest possible Young's modulus, and a rather small Poisson's ratio or small shearing modulus, which are usually not available in data sheets. Often only Young's modulus is specified.

Typical adhesives suitable for this purpose generally have a Shore hardnesses of Shore D 75 to 95 in the cross-linked, cured or processed state and typically have a glass transition temperature of >95° C. The tensile shear strength is typically >13.5 N/mm$^2$, which corresponds to approximately >2000 psi. The Shore hardness correlates with the Young's modulus and the shear strength. More important, however, are usually the exact curing conditions of the adhesive and also possible fillers. In particular, high levels of crosslinking can be achieved through long tempering times and/or elevated temperatures. Depending on the chemical composition of the adhesive, combination crosslinking is also conceivable, which can take place in multiple stages. For example, pre-crosslinking by UV light and subsequent thermal crosslinking can thus lead to high levels of crosslinking.

It should be noted that this is basically a conflict of objectives. On the one hand, particularly stable adhesives are required, which consist of several hundred processing cycles, especially during autoclaving, wherein correspondingly high chemical bonding stabilities are also required during plasma sterilization. On the other hand, precisely these adhesives induce stresses, which then lead to stress cracks in the glass-tube-fiber composite during the curing process, but which can be avoided or at least significantly reduced by the claimed design as described above.

A possibly advantageous use of the assembly device, as described previously in its embodiment variants, provides for the use for a light guide and/or for a light-guide cable, which in the medical technology environment or medico-technical or medical applications may be processed multiple times after each use by sterilization methods. This approach according to the invention can be advantageously used, in particular, in the case of light guides or light-guide cables as a connection between the light source and the endoscope or for connection to such assemblies and/or in the case of light guides installed in the endoscope. Applications in the industrial environment are also conceivable, for example in the fields of energy technology and aerospace, where high temperatures or high temperature fluctuations play a particularly major role.

Referring now to the drawings, FIG. 1 schematically shows an assembly device according to the prior art for a light guide 1, consisting of a fiber bundle 2, which was fused at its circumferential surface 2.5 with a glass tube 3 according to the GTF method described at the beginning. The fiber bundle 2 has a taper 2.4 here. The taper 2.4 results from the increase in the packing density of the individual fibers as a result of an increasing fusion between itself and the glass tube 3 up to the complete fusion or a fully fused part in or near the region of the common end face 2.3 and comprising it, with itself. The fiber bundle 2 with the glass tube 3 thus has at least near the surface at its common end face 2.3 a fused and thus rigid section 2.2, to which a transition region is connected, in which the fibers are only partially fused, which then transitions into a non-fused section 2.1. The fibers in the fiber bundle 2 are then arranged therein freely movably.

Typical diameters of such fused fiber bundles 2 are in the range of 0.5 to 10 mm. The length of the taper 2.4 or the transition region between the non-fused section 2.1 of the fiber bundle 2 and the common end face 2.3 of the fiber bundle 2 and the glass tube 3 is typically between 0.5 mm and 20 mm. The transition region between the non-fused section 2.1 and the fully fused section 2.2 can have typical values from 2 mm to 10 mm. Accordingly, the diameter of the assembly device is of similar magnitudes, in any case greater in each case than the diameter of the fiber bundle used. For a fiber bundle with a diameter of 2 mm, a total diameter of the assembly device of at least 3 mm can be assumed. Minimum possible wall thicknesses of the sleeve 4 are certainly specified by their material, or maximum, permissible or required total diameters are often determined by the application of light guides assembled in this way.

This GTF fiber bundle is then fixed in a sleeve 4 in the region of a fixing section 4.3 of the sleeve 4 with an adhesive 5, wherein the applied adhesive 5 ideally fills the gap to the common end face 2.3 to avoid gaps or holes. The sleeve 4 is ideally made of stainless steel, but can also be made of fiber-reinforced or filled plastics as described above. The final common end face 2.3 of the fiber bundle 2 is then produced together with the end face of the sleeve 4 by a subsequent grinding and polishing process. The disadvantage here, as described above, is the stress induced in the fused section 2.2 of the fiber bundle 2, which has already been introduced during the curing of the adhesive 5. Further stresses are then caused by temperature changes during processing, for example by steam sterilization. This often leads to cracks in the common end face 2.3, which on the one hand significantly reduces the yield during production and on the other hand significantly limits the service life or the number of processing cycles.

FIG. 2 schematically shows an embodiment provided according to the invention. In this embodiment, the fiber bundle 2 produced by the GTF method projects over the sleeve 4 by the offset distance 6 such that the adhesive 5 in the adhesive gap or in the fixing section 4.3 has a sufficient distance from the fused section 2.2 of the fiber bundle 2. This means that any stress introduced can be reduced both during assembly or adhesive curing and also during the processing cycles in use, and so the risk of cracking can be significantly minimized. In an exemplary configuration provided according to the invention, it has been shown that for the offset 6 or the offset distance between the common end face 2.3 of the fiber bundle 2 and the glass tube and the adhesive 5 surrounding the fiber bundle 2 or the fixing section 4.3, at least 0.1 mm to 2 mm may be advantageous, with an offset distance of 0.5 mm to 1.0 mm being possibly preferred. Tests have shown that this offset distance 6 is largely independent of the diameter of the fiber bundle 2 with the glass tube 3. The adhesive or the adhesive bond should have an adhesive gap between the glass tube 3 and the inner surface of the sleeve 4 of from 0.05 mm to 0.2 mm.

Figure 3:
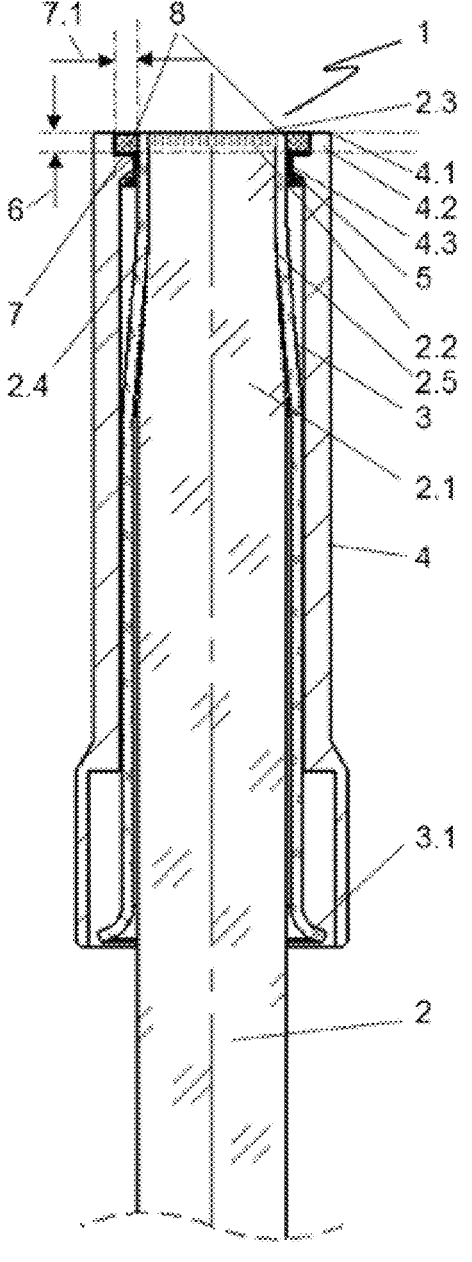
FIG. 3 schematically shows a variant of the assembly device with a sleeve which forms a ring.

A potential disadvantage of this embodiment shown in FIG. 2 is that the edges of the common end face 2.3 of the fiber bundle 2 produced by the GTF method are not very protected and are exposed. Therefore, a further embodiment variant is schematically illustrated in FIG. 3, in which the sleeve 4 is designed in such a way that the fixing section 4.3 is arranged so as to be spaced apart by the offset 6 from the end face 4.1. and a ring 4.2 is formed such that a circumferential groove 7 is formed in the assembled state in the region of the common end face 2.3 between the ring 4.2 and the glass tube 3, and the sleeve end face 4.1 and the common end face 2.3 of the fiber bundle 2 and the glass tube 3 form one plane. This allows for all-round lateral mechanical protection of the free-standing end of the glass-tube-fused fiber bundle.

With regard to the avoidance of gaps that are too narrow, which favors germ formation or the deposition of germs or contaminants, as mentioned in the introductory part, or hinders reduction thereof, the groove 7 has a groove width 7.1 of at least 0.3 mm, optionally at least 0.5 mm. During assembly, it must be ensured that this groove 7 between the ring 4.2 and the glass tube 3 must not be coated or filled with adhesive 5.

Optionally, provision may be made for the groove 7 to be filled with a permanently elastic and self-levelling potting compound 8 after assembly and the grinding and polishing process of the common end face 2.3, which compound prevents, for example, particles which are difficult to remove during the processing process, for example, from settling there. Such potting compounds 8 have in particular a correspondingly high temperature resistance, such that they in particular also survive typically applied temperatures during the steam sterilization in the order of 135° C. to 140° C., depending on the cycle used, several times, usually several hundred times. In addition, such potting compounds exhibit high hydrolysis resistance and chemical resistance. Silicone potting compounds, such as so-called LSR potting compounds (Liquid Silicone Rubber) or permanent elastic epoxy potting compounds, are particularly suitable for this purpose.

Figure 4:
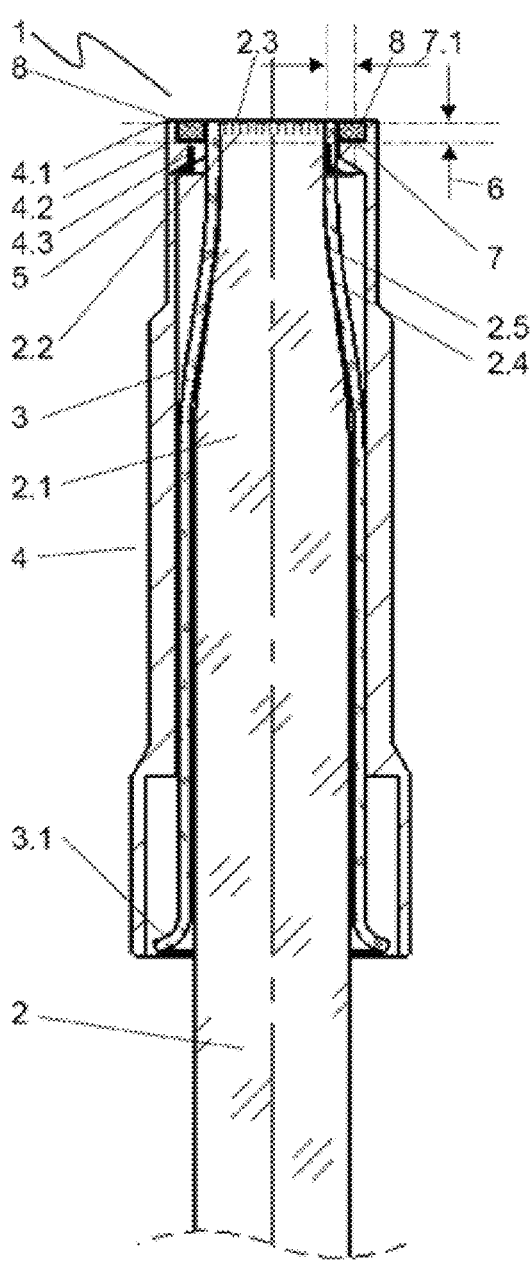
FIG. 4 schematically shows a further variant regarding the variant shown in FIG. 3.

FIG. 4 shows a variant regarding the embodiment shown in FIG. 3, which also has the optional potting compound 8. The conical GTF fusion differs from the fusions shown in FIGS. 1 to 3 in that the ratio of the diameters of the non-fused bundle, i.e. the non-fused section 2.1, and the fused section 2.2 is made greater by an additional manufacturing step than in the other fusions. Thus, the end face 2.3 of FIG. 4 has a smaller or reduced diameter compared to the variants of FIGS. 1 to 3. The sleeve 4 may, as shown schematically here, also have further sections which have, for example, in part or in sections a reduced wall thickness, in particular in the region of the end faces, and/or (not shown here) have additional clamping or latching elements, which in turn at least benefit or allow the assembly of such a prefabricated light guide to a light source, a camera module or a handpiece, for example, of an endoscope. In order to facilitate the insertion or threading of the fiber bundle 2 into the glass tube 3 prior to the so-called GTF fusion, the glass tube 3 may have a ring 3.1 on the threading side. This ring 3.1 may be embodied as a rounded ring as shown, or as a conical section (not shown).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCE SIGNS

1 Light guide
2 Fiber bundle
2.1 Non-fused region
2.2 Fused region
2.3 Common end face 2.4 Taper
2.5 Circumferential surface
3 Glass tube
3.1 Ring
4 Sleeve
4.1 Sleeve end face
4.2 Ring
4.3 Fixing section
5 Adhesive
6 Offset
7 Groove
7.1 Groove width
8 Potting compound

What is claimed is:

1. An assembly device for a light guide, comprising:
a sleeve having an end face; and
at least one fiber bundle circumferentially fused at least in part or in sections at its circumferential surface with a glass tube, and the at least one fiber bundle with the glass tube having a common end face, the at least one fiber bundle with the glass tube forming a tapered region towards the common end face, wherein the common end face with the glass tube has a fused, rigid section and the common end face is designed or designable as a ground and/or polished surface, wherein the at least one fiber bundle with the glass tube is cohesively fixed or fixable in the tapered region at least in part or in sections in or on the sleeve in or on a fixing section of the sleeve by an adhesive, wherein the common end face of the at least one fiber bundle with the glass tube has an offset relative to the fixing section of the sleeve with the adhesive such that the common end face is arranged or arrangeable so as to be spaced apart with an offset from the fixing section with the adhesive, and the fixing section and the common end face are separated or separable from each other.

2. The assembly device of claim 1, wherein the offset between the common end face of the at least one fiber bundle with the glass tube and a sleeve end face is in a range of 0.1 mm to 2 mm.

3. The assembly device of claim 2, wherein the offset between the common end face of the at least one fiber bundle with the glass tube and the sleeve end face is in the range of 0.5 mm to 1.0 mm.

4. The assembly device of claim 1, wherein a distance of 0.05 mm to 0.2 mm is formed or formable inside in the fixing section between the glass tube and the sleeve in part or in sections as an adhesive gap for the adhesive.

5. The assembly device of claim 1, wherein the sleeve is designed in such a way that: the fixing section is arranged or arrangeable so as to be spaced apart by the offset from a sleeve end face; a ring is formed or formable so that a circumferential groove is formed in an assembled state in a region of the common end face between the ring and the glass tube; and the sleeve end face and the common end face of the at least one fiber bundle and the glass tube form one plane.

6. The assembly device of claim 5, wherein the groove has a groove width of at least 0.3 mm.

7. The assembly device of claim 6, wherein the groove width is at least 0.5 mm.

8. The assembly device of claim 1, wherein the sleeve comprises stainless steel, plastic, or a combination of both material classes or consists thereof.

9. The assembly device of claim 1, wherein the adhesive comprises highly crosslinking, brittle-hard epoxy adhesive or consists thereof.

10. A use of the assembly device of claim 1 for a light guide and/or for a light-guide cable, which in a medical technology environment may be processed multiple times by sterilization methods.

* * * * *